United States Patent Office 2,872,581
Patented Feb. 3, 1959

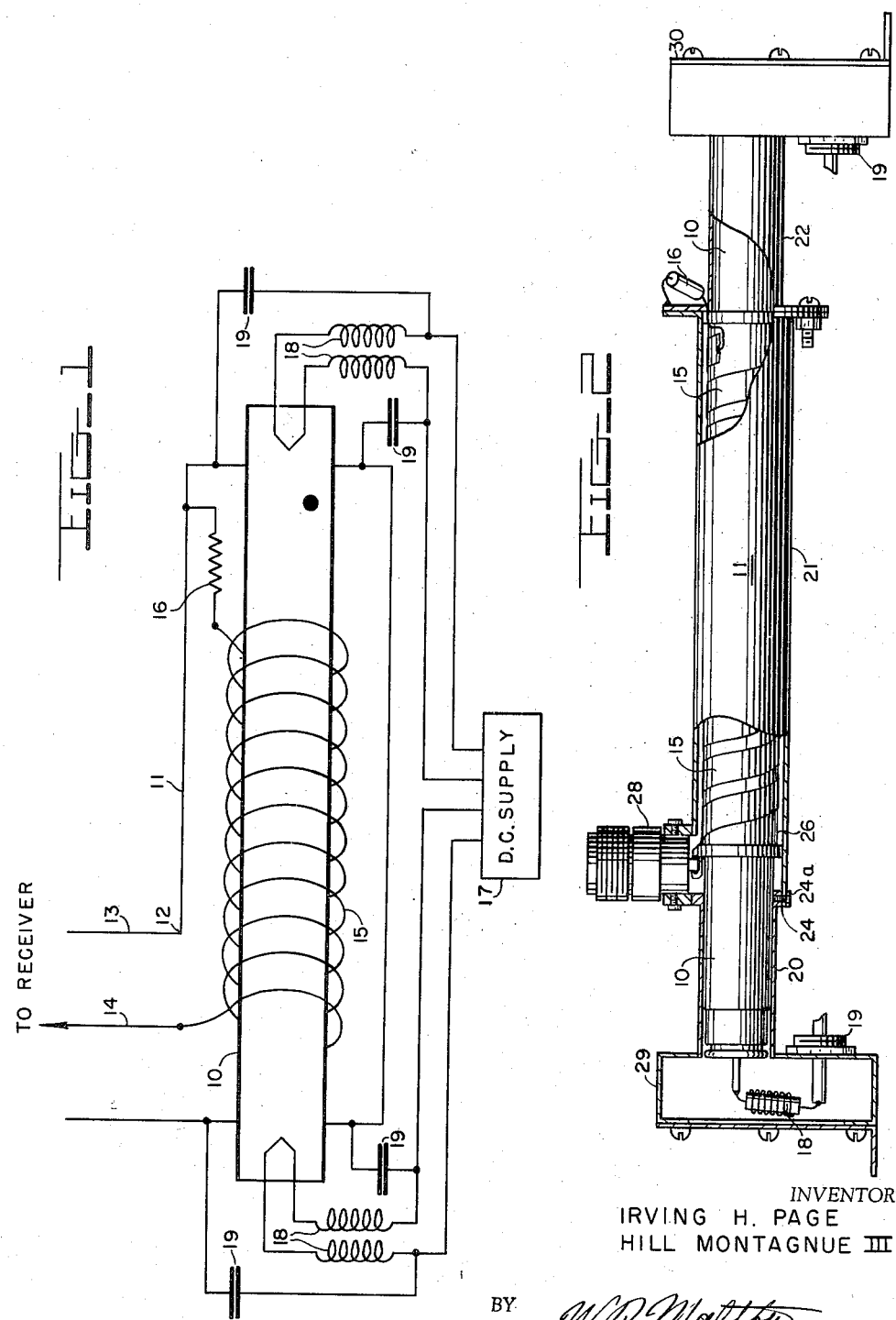

2,872,581

BROADBAND NOISE SOURCE

Irving H. Page, Washington, D. C., and
Hill Montague III, Alexandria, Va.

Application October 6, 1955, Serial No. 539,038

11 Claims. (Cl. 250—36)

(Granted under Title 35, U. S. Code (1952), sec. 266)

The invention described herein may be manufactured and used by or for the Government of the United States of America for governmental purposes without the payment of any royalties thereon or therefor.

This invention relates generally to random noise sources and more particularly to random noise sources having a constant impedance over a wide frequency range.

The minimum useable signal detectable by a receiver is limited by the amount of noise accompanying the signal. Unfortunately the noise tending to shroud the signal is not restricted to that appearing at the receiver input terminals but includes to varying extent noise generated in the receiver itself. Inasmuch as the amount of internally generated noise is dependent upon receiver characteristics and qualities, the problem of minimizing internal noise is a major consideration in receiver design. In part this requires the actual measurement of internally generated receiver noise. Although there are several ways of measuring noise, all require a low level signal source having an available output that is accurately known. In addition the source must have an output impedance equal to that of the signal source normally used with the receiver. The signal suorce usually selected for this purpose is a generator of random noise. Noise sources readily meet several of the requirements. Random noise sources generally produce low level signals whose power output may be accurately determined. In addition, since their output is not limited to discrete frequencies, the receiver bandwidth need not be considered in evaluating the receiver output. The remaining requirement is to provide the noise generator with an output impedance equal to that of the signal source normally used with the receiver.

The gaseous discharge occurring within a fluorescent lamp has been discovered to provide an excellent noise source inasmuch as it features a constant available output power at a convenient level. It remains then to couple the discharge of the fluorescent lamp to the receiver input terminals. This has been accomplished over a narrow band of frequencies by inserting a fluorescent lamp transversely through a section of waveguide. Although this arrangement will couple enregy from the discharge to the waveguide, an impedance match can be obtained only over a narrow frequency range and then only by the provision of several tuning accessories in the waveguide section. It was later found by passing a fluorescent lamp through a waveguide at a small angle to the longitudinal axis thereof, a desirable impedance relationship could be maintained over a frequency range approaching the fundamental pass band of the waveguide. However, a noise source requiring a waveguide element as a portion of its structure becomes unduly restrictive in frequency range. Because of size requirements waveguides are considered impractical below 1000 mc. and in their useful frequency have an undesirably small pass band. Thus several waveguide noise sources would be required to cover any appreciable frequency range.

It is therefore an object of this invention to provide a structure for matching a gaseous discharge to a load over a broad band of frequencies.

It is another object of this invention to match the gaseous discharge of a fluorescent lamp to a load over a broad band of frequencies.

It is another object of this invention to match a gaseous discharge of a fluorescent lamp to a coaxial line over a broad band of frequencies.

It is another object of this invention to provide a noise source having a fluorescent lamp useable over a broad band of frequencies.

It is another object of this invention to provide a noise source having a fluorescent lamp useable throughout a large portion of the U. H. F. spectrum.

Other objects and advantages of this invention will become apparent from a consideration of the following description and accompanying drawings wherein:

Fig. 1 is a schematic diagram of a representative embodiment of this invention; and Fig. 2 is a side elevational view partially in section of a preferred embodiment of this invention.

Briefly, this invention utilizes a coaxial line as an energy transmission means capable of operating over a broad frequency spectrum with substantially uniform impedance. A fluorescent lamp discharge means is coupled to the coaxial line by inserting it in another portion of coaxial line surrounded by a helix which serves as the center conductor. One end of the helix is the noise source output and the other end of the helix is terminated in the characteristic impedance of the line.

Referring now to Figure 1 in detail, a schematic diagram is shown for coupling the discharge of a fluorescent lamp to a coaxial line according to this invention. A fluorescent lamp 10 is coaxially mounted within a closed conducting cylinder 11 having openings at each end large enough to permit the fluorescent lamp to protrude therethrough. Cylinder 11 also has an opening 12 in its cylindrical surface near one end thereof to permit junction with a section of transmission line 13 for connection to a receiver. The central conductor 14 from transmission line 13 terminates within cylinder 11 by connection to one end of a helix 15. Helix 15 is wound around the fluorescent lamp 10 and serves to couple energy from the lamp's discharge to transmission line 13. The other end of helix 15 is connected to the cylinder 11 through a resistance 16. Cylinder 11 serves as the outer conductor of a coaxial transmission line section and helix 15 serves as its inner conductor. Resistance 16 provides a resistive termination for the thus constituted transmission line section and is selected to have a value equal to the characteristic impedance of this line section. Line 13 and also the line formed with cylinder 11 and helix 15 should be designed and constructed to have the same characteristic impedance. This impedance value should be the same as that normally connected to the receiver input terminals.

Fluorescent lamp 10 is preferably excited from a D. C. supply 17. The lamp is excited in the conventional way through connection of its four input terminals to the D. C. supply. To avoid noise from the source reaching the receiver through other than the transmission line 13, the four D. C. lines to the lamp terminals are respectively filtered through four series R. F. chokes 18. The filtering action of chokes 18 is assisted by four by-pass condensers 19 connected between the D. C. supply side of each choke and cylinder 11 or ground. The chokes and condensers are preferably shielded in an enclosed space as shown in Fig. 2 discussed below.

The specific embodiment shown in Fig. 2 uses a standard 6 watt fluorescent lamp and matches a 50 ohm coaxial line over a frequency range of 250 to 2400 megacycles while maintaining a voltage standing wave ratio of less than 1.25 and less than 1.2 below 1350 megacycles. Referring now to Fig. 2 in detail, cylinder 11 is shown in three sections, 20, 21 and 22. Section 21 connects and lies between sections 20 and 22 and is of larger diameter. It surrounds the portion of the fluorescent lamp about which the helix is wound. Sections 20 and 22 are small enough to snugly encompass the fluorescent lamp 10 while still permitting it to be inserted therethrough. Section 20 is attached to section 21 at their annular junction 24 as by radial screws 24a. Sections 21 and 22 are each provided with flanges 25 by which they may be bolted together. A cylinder 26 of non-conducting material such as Teflon polytetrafluoroethylene which is disposed over the central section of the lamp 10, closely surrounds the central portion of the fluorescent lamp 10 and provides a form for helix 15. In the embodiment illustrated helix 15 is wound from copper foil .002 of an inch thick cut into a strip or tape .195 of an inch wide and has 19 turns. The left end of helix 15 is connected to the center terminal of coaxial line connector 28. The right end of helix 15 is connected to a physical resistor 16 which is mounted outside cylinder 11 but has one lead entering the connection of cylinders 21 and 22. The other end of the resistor 16 is grounded to cylinder 11. The two pins at each end of the fluorescent tube are enclosed by rectangular metal chambers 29 and 30. Chamber 29 is shown in cross section to permit illustration of the mounting of the series R. F. chokes and by-pass condensers 18 and 19. Each of the chokes 18 are made of ten turns of No. 20 wire wound on a 1/8 inch form one-half inch long. The condensers 19 are 500 micromicrofarad feed through condensers. While the discharge current is not critical, a current of 100 milliamperes is found preferable.

The receiver whose sensitivity is to be measured is connected through a 50 ohm coaxial line 13 to junction 28. It has been found that cylinder 11 and helix 15 may present a different impedance when the lamp is unenergized than when the discharge is present. Therefore, it is preferable to measure the receiver output in the absence of a signal from the noise source by switching the receiver input to a dummy 50 ohm load rather than by interrupting the discharge in lamp 10.

For initial achievement of an impedance match or for matching the device to a line of different impedance it is most convenient to alter the dimensions by altering the helix. Since the number of turns should be kept high to maintain the coupling to the discharge, the helix should be adjusted by varying the tape width or spacing. It has been found that adjusting the tape width is most effective in controlling the impedance.

Obviously many modifications and variations of the present invention are possible in the light of the above teachings. It is therefore to be understood that within the scope of the appended claims the invention may be practiced otherwise than as specifically described.

What is claimed is:

1. A random noise source having a constant output impedance over a broad band of frequencies comprising, a coaxial line section having an inner and outer conductor, an elongated gaseous discharge envelope coaxially disposed within said line section, the inner conductor of said line being disposed adjacent said envelop in coupling relation to said discharge, one end of said inner and outer conductors forming the output terminal of said noise source and the other end being terminated in the characteristic impedance of the line section.

2. A random noise source having a constant output impedance over a broad band of frequencies comprising, a coaxial line section having an inner and outer conductor, a fluorescent lamp coaxially disposed within said line section, an energy source connected to said lamp for producing a discharge therein, the inner conductor of said line being disposed adjacent said lamp in coupling relation to said discharge, one end of said inner and outer conductors forming the output terminal of said noise source and the other end being terminated in the characteristic impedance of the line section.

3. A random noise source having a constant output impedance over a broad band of frequencies comprising, a coaxial line section having an inner and outer conductor, an elongated gaseous discharge envelope coaxially disposed within said line section, the inner conductor of said line being in the form of a helix surrounding at least a portion of said elongated envelope, one end of said inner and outer conductors forming the output terminal of said noise source and the other end being terminated in the characteristic impedance of the line section.

4. A random noise source having a constant output impedance over a broad band of frequencies comprising, a coaxial line section having an inner and outer conductor, a fluorescent lamp coaxially disposed within said line section, an energy source connected to said lamp for producing a discharge therein, the inner conductor of said line being in the form of a helix surrounding at least a portion of said fluorescent lamp, one end of said inner and outer conductors forming the output terminal of said noise source and the other end being terminated in the characteristic impedance of the line section.

5. A random noise source having a constant output impedance over a broad band of frequencies comprising, a coaxial line section having an inner and outer conductor, a fluorescent lamp coaxially disposed within said line section, an energy source connected to said lamp for producing a discharge therein, the inner conductor of said line being in the form of a helix surrounding at least a portion of said fluorescent lamp, the relative dimensions of said helix and said outer conductor being selected to provide the desired impedance for said line section, one end of said inner and outer conductors forming the output terminal of said noise source and the other end being terminated in the characteristic impedance of the line section.

6. A random noise source having a constant output impedance over a broad band frequencies comprising, a coaxial line section having an inner and outer conductor, a fluorescent lamp coaxially disposed within said line section, an energy source connected to said lamp for producing a discharge therein, the inner conductor of said line being in the form of a helix surrounding at least a portion of said fluorescent lamp, said helix being formed from a tape of thin conducting foil, one end of said inner and outer conductors forming the output terminal of said noise source and the other end being terminated in the characteristic impedance of the line section.

7. A random noise source having a constant output impedance over a broad band of frequencies comprising, a coaxial line section having an inner and outer conductor, a fluorescent lamp coaxially disposed within said line section, an energy source connected to said lamp for producing a discharge therein, the inner conductor of said line being in the form of a helix surrounding at least a portion of said fluorescent lamp, said helix being formed from a tape of thin conducting foil having a width selected to provide the desired impedance for said line section, one end of said inner and outer conductors forming the output terminal of said noise source and the other end being terminated in the characteristic impedance of the line section.

8. A random noise source having a constant output impedance over a broad band of frequencies comprising, a coaxial line section having an inner and outer conductor, said outer conductor being in the form of a closed conducting cylinder having ports in each end thereof for receiving a fluorescent lamp therein, a non-conducting cylinder of smaller diameter than said conducting cylinder and coaxially disposed therein in alignment with said ports and being large enough to receive a fluorescent lamp therein, a helix formed of thin foil tape wound around said non-conducting cylinder, another opening in the conducting cylinder near one end thereof for permitting external connection to one end of said helix, the dimensions of said helix and said conducting cylinder being selected to provide a desired value of characteristic impedance for said line section, means terminating the other end of said helix in said desired impedance value, a shielding enclosure surrounding the ports in each end of the conducting cylinder for enclosing the ends of a fluorescent lamp therein, and filtering means in said enclosure for connection between a fluorescent lamp and its energizing source.

9. A random noise source having a constant output impedance over a broad band of frequencies comprising, a coaxial line section having an inner and outer conductor, an elongated gaseous discharge envelope coaxially disposed within said line section, the inner conductor of said line being disposed adjacent said envelope in coupling relation to said discharge, whereby random noise is coupled to said coaxial line.

10. A random noise source having a constant output impedance over a broad band of frequencies comprising, a coaxial line section having an inner and outer conductor, an elongated gaseous discharge envelope coaxially disposed within said line section, the inner conductor of said line being a strip conductor formed into a flat wound helix coaxial with said outer conductor and in coupling relation to said discharge, whereby random noise is coupled to said coaxial line.

11. A random noise source having a constant output impedance over a broad band of frequencies comprising, a coaxial line section having an inner and outer conductor, a fluorescent lamp coaxially disposed within said line section, an energy source connected to said lamp for producing a discharge therein, the inner conductor of said line being a strip conductor formed into a flat wound helix and surrounding at least a portion of said fluorescent lamp, the relative dimensions of said helix and said outer conductor being selected to provide the desired impedance for said line section, one end of said inner and outer conductors forming the output terminal of said noise source and the other end being terminated in the characteristic impedance of the line section.

References Cited in the file of this patent

UNITED STATES PATENTS 2,745,013    Hines  ---------------- May 8, 1956